United States Patent [19]

Okumura et al.

[11] Patent Number: 5,779,141
[45] Date of Patent: Jul. 14, 1998

[54] HEATING APPARATUS

[75] Inventors: Yoshihiko Okumura; Koichi Ito, both of Kariya; Yoshimitsu Inoue, Chiryu; Hikaru Sugi, Nagoya, all of Japan

[73] Assignee: Nippondenso Co., Ltd., Kariya, Japan

[21] Appl. No.: 684,076

[22] Filed: Jul. 19, 1996

[30] Foreign Application Priority Data

Jul. 21, 1995 [JP] Japan ................. 7-185312

[51] Int. Cl.$^6$ .................. F28F 27/00; G05D 23/00
[52] U.S. Cl. ............... 236/36; 165/295; 236/78 D
[58] Field of Search ................. 236/78 D, 36; 165/291, 295

[56] References Cited

U.S. PATENT DOCUMENTS

| | | |
|---|---|---|
| 4,412,647 | 11/1983 | Lampert ................. 236/36 |
| 4,702,306 | 10/1987 | Herzog ................. 165/295 X |
| 5,335,708 | 8/1994 | Murakami et al. ........... 236/78 D |

FOREIGN PATENT DOCUMENTS

| | | |
|---|---|---|
| 5-213041 | 8/1993 | Japan . |
| 5-68704 | 9/1993 | Japan . |

Primary Examiner—William E. Wayner
Attorney, Agent, or Firm—Cushman Darby & Cushman IP Group of Pillsbury Madison & Sutro LLP

[57] ABSTRACT

A heating apparatus of a re-heat type for an air conditioning system for a vehicle provided with an internal combustion engine. The heating apparatus includes a flow control valve for controlling an amount of an engine hot water directed to a heat exchanger for heating. When the degree of the opening of the flow control valve is ⅜ or less and when the target degree of the opening of the flow control valve is ⅜ or more, a control of the degree of the opening of the flow control valve to the target opening plus a predetermined overshoot amount is initially executed, which is followed by a control to the target opening. When both of the initial and target opening is larger than ⅜ or the initial and target opening are identical, the overshoot control is not carried out, i.e., the degree of the opening of the flow control valve is directly controlled to the target value.

8 Claims, 11 Drawing Sheets

HEATING APPARATUS

BACKGROUND OF THE INVENTION

1. Field of the Invention

The present invention relates to a heating apparatus for controlling a temperature of an air flow discharged into a cabin in an air conditioning system for a vehicle provided with an internal combustion engine.

2. Background of the Invention

Two types of heating apparatus for an air conditioning system for a vehicle are known, a re-heat type and an air-mix type. In the re-heat type heating apparatus, all of a cooled air flow from an evaporator of the air conditioning system is introduced into a heat exchanger for heating the air flow. In order to control the temperature of the air discharged into the cabin, control of an amount of hot water from a cooling system of the internal combustion engine is done. Contrary to this, in the air-mix type heating apparatus, a cooled air from the evaporator is partly introduced into a heat exchanger via an air mix damper. The remaining air is by-passed the heat exchanger, and is mixed with the heated air after passed through the heat exchanger. In order to control the temperature of the air discharged into the cabin, control of a degree of an opening of the air mix damper is done.

The re-heat type heating apparatus is advantageous over the air mix type heating apparatus in that a reduction of a dimension of a duct becomes possible due to a fact that a space for mixing the cooled air and a hot air in the air mix type is unnecessary. The elimination of the mixing space is effective for reducing an air flow resistance, thereby enhancing an efficiency of an air fan as well as reducing an operating noise of the fan.

Regarding the re-heat type heater, the Japanese Unexamined Utility Model Application No. 5-68704 discloses a control of a temperature of a discharged air temperature, wherein a change in a set temperature of air in a cabin causes a target value of a degree of an opening of a flow control valve to be calculated, so that a temporary overshoot of the degree of the opening of the flow control valve is obtained. After a lapse of a period of the overshoot control, the degree of the opening of the flow control valve is reduced to the target value. Such a temporal overshoot control upon a change of the setting of the temperature is for controlling the discharged air temperature to the target value as quickly as possible.

However, the overshoot opening is essentially determined in accordance with a difference between the target opening and the existing degree of the opening in the control valve. Thus, in the case of a small difference between the target opening and the existing opening, a small overshoot opening is determined. Contrary to this, in case of a large difference between the target opening and the existing opening, a large overshoot opening is determined. As a result, the prior art suffers from a difficulty in that a desired overshoot can not be obtained in a situation where a large overshoot is necessary even with a small difference between the target opening and the existing degree of the opening in the control valve, which makes a response speed to be worsened in the temperature of the discharged air. Furthermore, there is a situation where an overshoot control is unnecessary even in a situation of a large value of the difference between the target opening and the existing degree of the opening in the control valve. In the latter case, an overshoot control is executed, which causes a precision of a control to the target temperature to be worsened.

SUMMARY OF THE INVENTION

An object of the present invention is to provide a heating apparatus capable of overcoming the above difficulty in the prior art.

Another object of the present invention is to provide a heating apparatus capable of controlling a desired amount of an overshoot regardless of a deviation of the degree of the opening of the flow control valve between a target value and an actual value.

Still another object of the present invention is to provide a heating apparatus capable of obtaining an overshoot control when it is necessary and of canceling an overshoot control when it is not necessary.

In order to attain these objects, the invention claimed in claims 1 to 7 features that an actual flow amount and a target flow amount of the hot water to the heat exchanger for heating are obtained and that a determination is done if these actual and target flow amounts are under respective conditions which necessitate the overshoot control to be effected. When these conditions are satisfied, the overshoot control of the water flow amount from the hot water source to the heat exchanger is, at the initial stage, executed, and then the hot water amount is controlled to the target amount. Contrary to this, if at least one of the condition is not satisfied, an overshoot control of the hot water amount is not practiced, i.e., the hot water amount is directly controlled to the target value.

In more detail, the first determining means determines if the actual hot water amount from the hot water source to the heating heat exchanger is in the first range. By this determination, a judgment whether or not the actual hot water amount satisfies the above mentioned condition can be done.

The second determining means determines if the target hot water amount from the hot water source to the heating heat exchanger is different from the actual hot water amount and is in the second range. By this determination, a judgment whether or not the target hot water amount satisfies the above mentioned condition can be done.

When the first and second determining means determine that the actual flow amount and the target flow amount satisfy the above conditions, the first control means control the flow control valve in such a manner that the hot water amount from the hot water source to the heating heat exchanger is, temporally, controlled to the target flow amount plus a predetermined overshoot amount and is, thereafter, controlled to the target flow amount.

Contrary to this, when the first and second determining means determine that at least one of the actual flow amount and the target flow amount does not satisfy the above condition, the second control means control the flow control valve in such a manner that the hot water amount from the hot water source to the heating heat exchanger is, from the beginning, controlled to the target flow amount. Namely, without any accompanying overshoot control of the hot water amount to the heat exchanger for the heating, the hot water amount is directly controlled to the target amount.

In short, according to the present invention, the target flow amount as well as the actual flow amount in the respective ranges cause the overshoot control to be practiced, which is followed by a control to the target flow amount. As a result, irrespective of the deviation of the hot water amount between the target value and the actual value, a desired degree of the overshoot control in the hot water amount to the heat exchanger for heating is done only when it is necessary.

Namely, an increased response speed in the temperature of the air after contacted with the heat exchanger for heating is obtained upon a change in the degree of the opening of the flow control valve.

Furthermore, according to the present invention, one of the target flow amount and the actual flow amount which is out of the overshoot range causes the hot water amount to be directly controlled to the target value without an accompanying overshoot control. As a result a reduction in the number of the operations of the flow control valve is obtained.

The invention claimed in claim 6 features that, when the actual flow amount is in a range between zero and 5% of the maximum flow amount and when the target flow amount is in a range between zero and 5% of the maximum flow amount, a temporal overshoot control of the hot water amount to the heat exchanger for the heating is carried out, which is followed by the control of the hot water amount so that it is controlled to the target value. Furthermore, when the actual and target flow amounts are not in the above ranges, the hot water amount is directly controlled to the target value without the accompanying overshoot control. In this case, the actual flow amount is a value which causes the water to be under a cold state in the heat exchanger for the heating. Thus, the advantage of the operation of the first and second control means is obtained under such a condition.

Furthermore, according to the invention claimed in claim 7, the heat exchanger is constructed by an inlet tank to which the hot water from the hot water source is introduced and subjected to a flow control by the flow control valve an outlet tank for returning the hot water to the hot water source, and a heat exchange core in which a flow of the hot water passes from the inlet tank and the outlet tank, the heat exchanger being arranged to generate a heat exchange between the hot water and the air.

The arrangement of the heat exchanger for heating having the inlet and outlet tanks allows a condition which necessitates the overshoot control to be always generated. Thus, a control by the provision of the first and second control means is very effective.

Furthermore, in the invention in claim 8, the actual flow amount detecting means is constructed by means for detecting an actual opening of the flow control valve, and the target flow amount calculating means is constructed by means for calculating a target opening of the flow control valve.

In this case, the first determining means determines if the actual opening of the flow control valve is in the predetermined first range. As a result, it can be determined if the actual opening satisfies the condition that necessitates the overshoot control of the flow control valve. Furthermore, the second determining means determines if the target opening of the flow control valve defers from the actual opening and in the predetermined second range. As a result, it can be determine if the target opening satisfies the condition that necessitates the overshoot control of the flow control valve.

When it is determined, by each of the first and second determination means, that conditions are satisfied that necessitate the overshoot control, the first control means controls the flow control valve in such a manner that the flow control valve is temporally controlled to the target opening plus a predetermined overshoot amount, and is then returned to the target opening.

Contrary to this, when it is determined, by the first or second determination means, that the conditions are not satisfied that necessitates the overshoot control, the second control means controls the flow control valve in such a manner that the flow control valve is controlled to the target opening. In other words, the flow control valve is directly controlled to the target opening without the accompanying overshoot control.

In short, according to the present invention, an overshoot control is, at the first state, carried out when both of the target opening and actual opening satisfies the conditions which necessitate the overshoot control, and a control to the target opening is, at the second stage, carried out. As a result, such a overshoot control is done only when it is necessary regardless the deviation of the target opening and the actual opening. In other words, an increase in the response speed in the temperature of the air for the heating is obtained only when it is required upon a change in the degree of the opening of the flow control valve.

Furthermore, according to the present invention, the flow control valve is directly controlled to the target opening when one of the target opening and the actual opening does not satisfy the conditions which necessitate overshoot control. Thus, an overshoot control, which is unnecessary, is eliminated, thereby reducing the number of the operations of the flow control valve.

It should be noted that the first and the second ranges recited in claims 1 may be identical or different with each other.

The maximum flow amount in claims 4 and 5 is the maximum flow amount from the hot water source to the heat exchanger for heating when the flow control valve is moved between extremity positions.

BRIEF DESCRIPTION OF ATTACHED DRAWINGS

FIGS. 8-(a) to 8-(d) illustrate progress in the distribution of the hot water in the heater core after commencement of an introduction of a hot water.

FIGS. 12-(a) to 12-(c) illustrate position of a valve member when the degree of the opening of the flow control valve is under $\theta_{old}$, $\theta_{pass}$ and $\theta_{new}$, respectively.

DETAILED EXPLANATION OF PREFERRED EMBODIMENTS

Now, an embodiment of the present invention directed to an application of a hot water type heating device for an air conditioning system for an automobile will be described with reference to the attached drawings.

Figure 1:
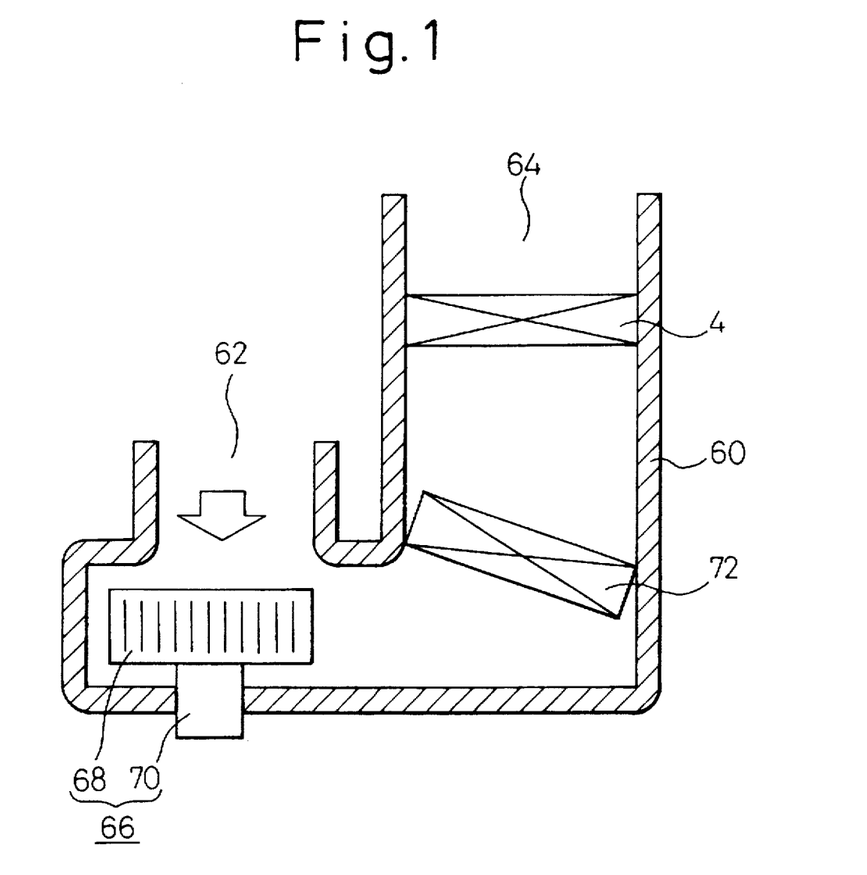
FIG. 1 schematically shows an air conditioning system for a vehicle.

FIG. 1 shows, schematically, an air conditioning system for an internal combustion engine of a re-heat type. The air conditioning system includes a duct 60 having, at its one end, an inlet 62 for introducing an outside or inside air and, at the other end, an outlet 64 opened to a cabin for discharging air flow to desired locations of the cabin. The inlet 62 includes a first inlet portion for introducing an outside air into the duct 60, a second inlet portion for introducing an inside air into the duct 60 and a switch (damper) for selecting one of the first and second inlets. The outlet 64 includes an upper outlet (face outlet) opened to a location of the cabin which is suitable for generating an air flow directed to an upper part of a driver or passenger, an lower outlet (leg outlet) opened to a location of the cabin which is suitable for generating an air flow directed to a lower part of a driver or passenger, and a defroster outlet opened to a location adjacent to a bottom of a windshield. Arranged inside the duct at a location adjacent the inlet 62 is a fan 66 for generating a flow of the air in the duct 60. The fan 66 is constructed by a fan member 68 and an electric motor 70 for generating a rotating movement of the fan member 68. A cooling unit 72 is arranged in the duct 60 at a location downstream from the fan 66. The cooling unit 72 as an evaporator is located in a refrigerating system, which, in addition to the evaporator 72, includes a compressor, a condenser and an expansion valve. A heat exchange occurs between the air flow contacting the cooling unit 72 and a refrigerant flowing in the cooling unit, thereby cooling the air flow. A heater core 4 is arranged in the duct 60 at a location downstream from the cooling unit. As explained later, engine cooling water passes through the heater core/heat exchanger 4, so that a heat exchange occurs between the air flow and the engine cooling water. Thus, in this re-heat type device, the cooled air from the cooling unit 72 is again heated to a predetermined temperature. The air is finally discharged from the outlet 64 to the cabin at a selected location among the upper level, the lower level and the defroster outlets.

Figure 2:
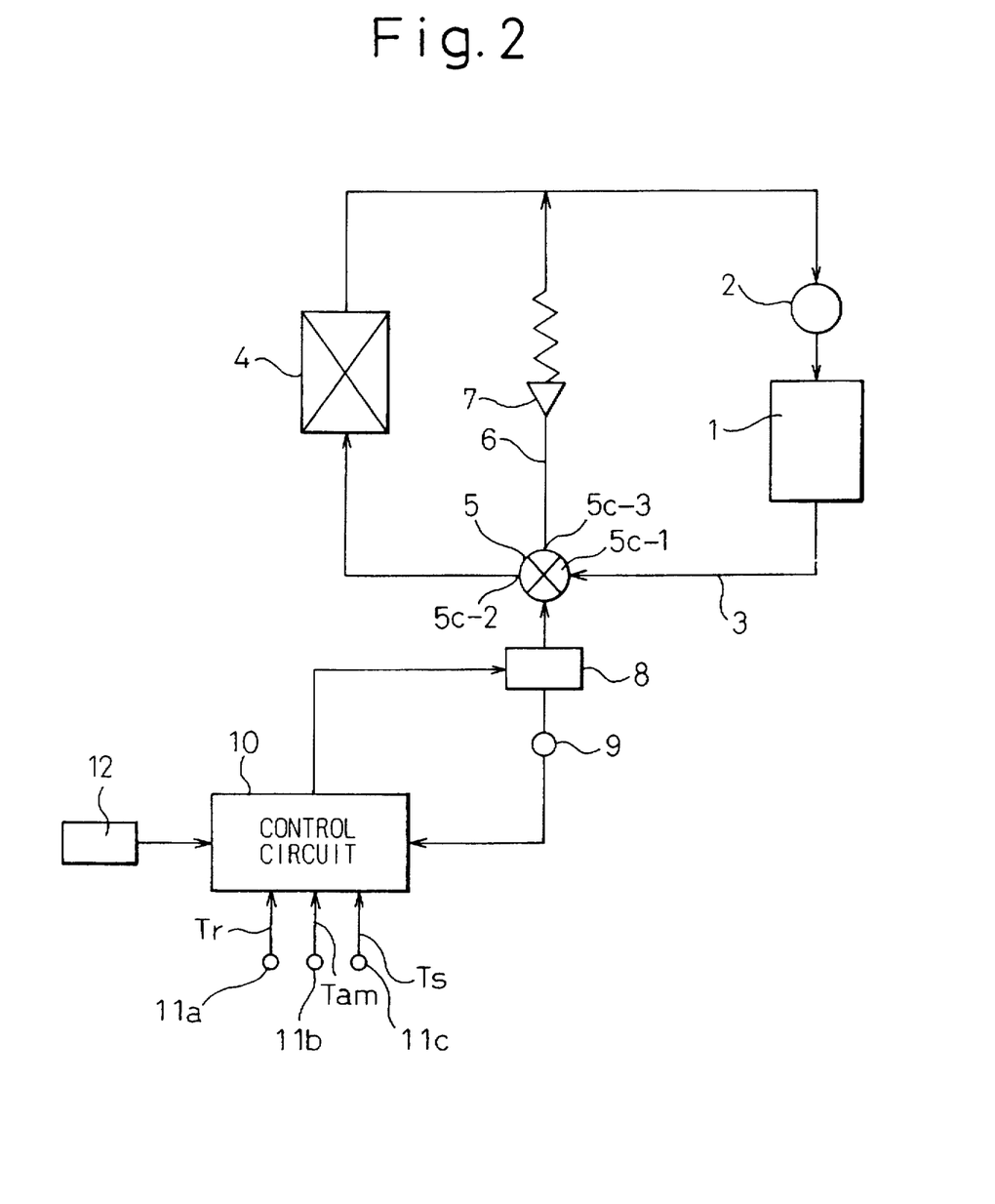
FIG. 2 shows an entire a heating apparatus in FIG. 1.

FIG. 2 illustrates an engine cooling water recirculating system for the heater core 4. An internal combustion engine 1 includes a water type cooling system, in which an water pump 2 is arranged. The water pump 2 has a drive shaft, which is subjected to a rotating movement of a crankshaft (not shown) of the internal combustion engine. The water pump 2 is located in an engine cooling water recirculating passageway 3 in such a manner that a recalculated flow of the engine cooling water is obtained in the passageway 3. The heater core 4, which is in a contact with the air flow in the duct 60 in FIG. 1, is arranged on the engine cooling water recirculating passageway 3. A reference numeral 5 denotes a flow control valve for controlling an amount of the engine cooling water introduced into the heater core 4. The water cooling system of the internal combustion engine 1 thus acts as a source of hot water.

Figure 3:
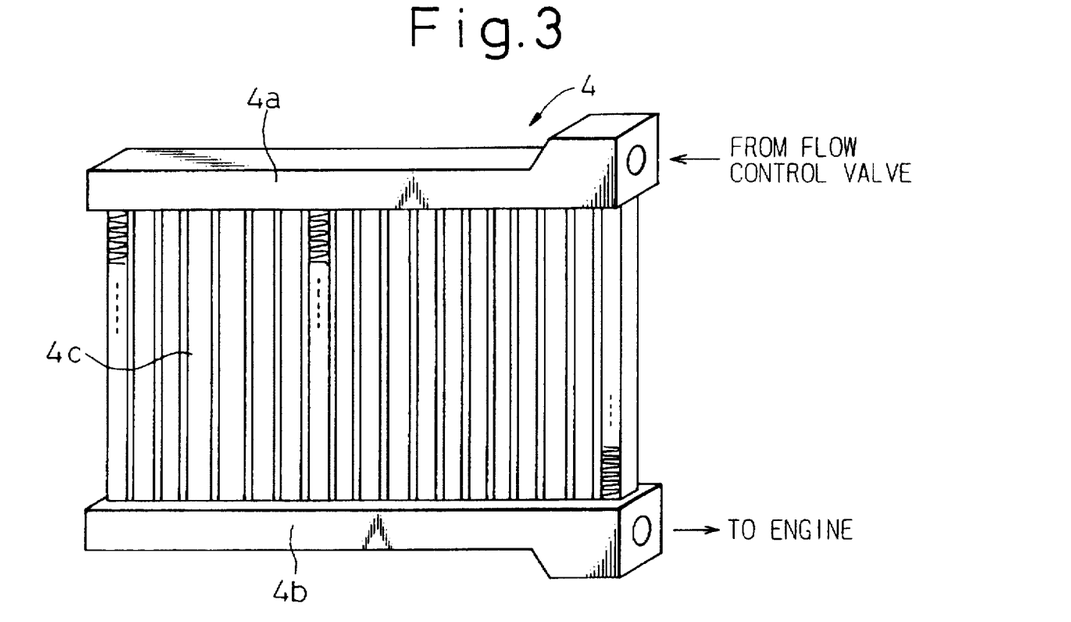
FIG. 3 is a schematic perspective of a heater core in FIG. 2.

As shown in FIG. 3, the heater core 4 has a inlet tank 4a, to which the hot water from the water cooling system of the internal combustion engine 1 after subjected to the flow amount control at the flow control valve 5 is introduced, an outlet tank 4b for returning the hot water to the internal combustion engine 1, and a heater core section 4c arranged between the inlet tank 4a and 4b so that flows of hot water to be subjected to a heat exchange are obtained at the heat exchanging section 4c.

Figure 4:
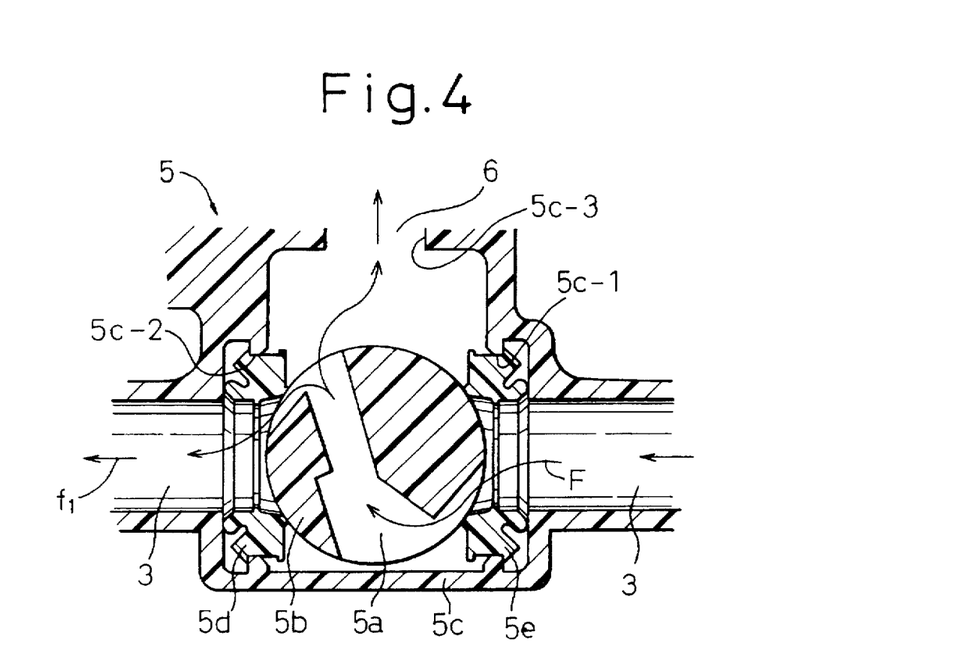
FIG. 4 is a cross sectional view of a flow control valve in FIG. 2.

As schematically illustrated in FIG. 4, the flow control valve 5 includes a valve passageway 5a through which the hot water is passed, a valve member 5b of a cylindrical shape made of a plastic material in which the valve passageway 5a is formed and a valve housing 5c also made of a plastic material in which the valve member 5b is stored. In FIG. 4, the valve member 5b has an axis of elongation which is transverse to the paper, so that the valve member 5b is rotated about the axis. The valve housing 5c is formed with a first, a second and a third ports 5c-1, 5c-2 and 5c-3. The first and second ports 5c-i and 5c-2 are connected to the passageway 3 and located opposite to each other so that the valve member 5b is arranged between the ports 5c-1 and 5c-2. Ring shaped seal members 5e and 5d are arranged at the ports 5c-1 and 5c-2, respectively, while contacting with the valve member 5b, thereby obtaining a desired sealing effect while maintaining a smooth rotating movement of the valve member 5b. Connected to the valve member 5b is a rotating motor 8 formed as a servo-motor 8 as shown in FIG. 2, so that a rotating movement of the valve member 5b is obtained. A sensor 9 such as a potentiometer is connected to the rotating motor 8, and generates a signal indicating a rotating angle of the valve member 5b.

In FIG. 2, the by-pass passageway 6, which is connected to the port 5c-3 (FIG. 4), is arranged in parallel to the heater core 4. A constant pressure difference valve (pressure responsive valve) 7 is arranged in the by-pass passageway 6. The valve 7 is normally under a closed condition, and is opened when a pressure difference larger than a predetermined value is obtained between the inlet and the outlet of the valve 7. This operation of the valve 7 allows a pressure difference across the heater core 4 to be substantially unchanged even in a presence of a variation of the pressure issued from the water pump 2, which is caused by a variation in the rotational speed of the crank shaft of the internal combustion engine.

In a known manner, the constant pressure difference valve 7 is integrated with the flow control valve 5 as well as the by-pass passageway 6. This integrated assembly is connected integrally to the heater core 4.

In FIG. 2, a control circuit 10 is provided, which is constructed as a microcomputer system including various elements such as CPU, ROM and RAM. The control circuit 10 is connected to various sensors including, in addition to the potentiometer 9 as explained above, an inner temperature sensor 11a for detecting the temperature Tr of the air inside the cabin, an outer temperature sensor 11b for detecting the temperature Tam of the air of the outside atmosphere, and a sensor 11c for detecting a sun radiation amount Ts introduced into the cabin. Namely, signals indicating the inner and outer air temperature and the sun radiation amount are introduced into the control circuit 10. The temperature setter 12 is for manually setting a target temperature of the air inside the cabin and is also connected to the control circuit 10, so that the signal indicating the target temperature is introduced into the control circuit 10. Based on these signals, the control circuit 10 effects desired calculations for obtaining a signal directed to the control valve 5, so that the degree of the opening of the valve member 5b, i.e., a rotating angle of the valve member 5b is controlled. Namely, in accordance with the degree of the rotating angle of the valve member 5b, the ratio of the amount of the water directed to the heater core 4 as shown by an arrow $f_1$ in FIG. 4 to the total amount of the water introduced into the valve as shown by an arrow F is controlled. This type of system for controlling a heating capacity by the heater core 4 is called as a flow amount control type.

Figure 5:
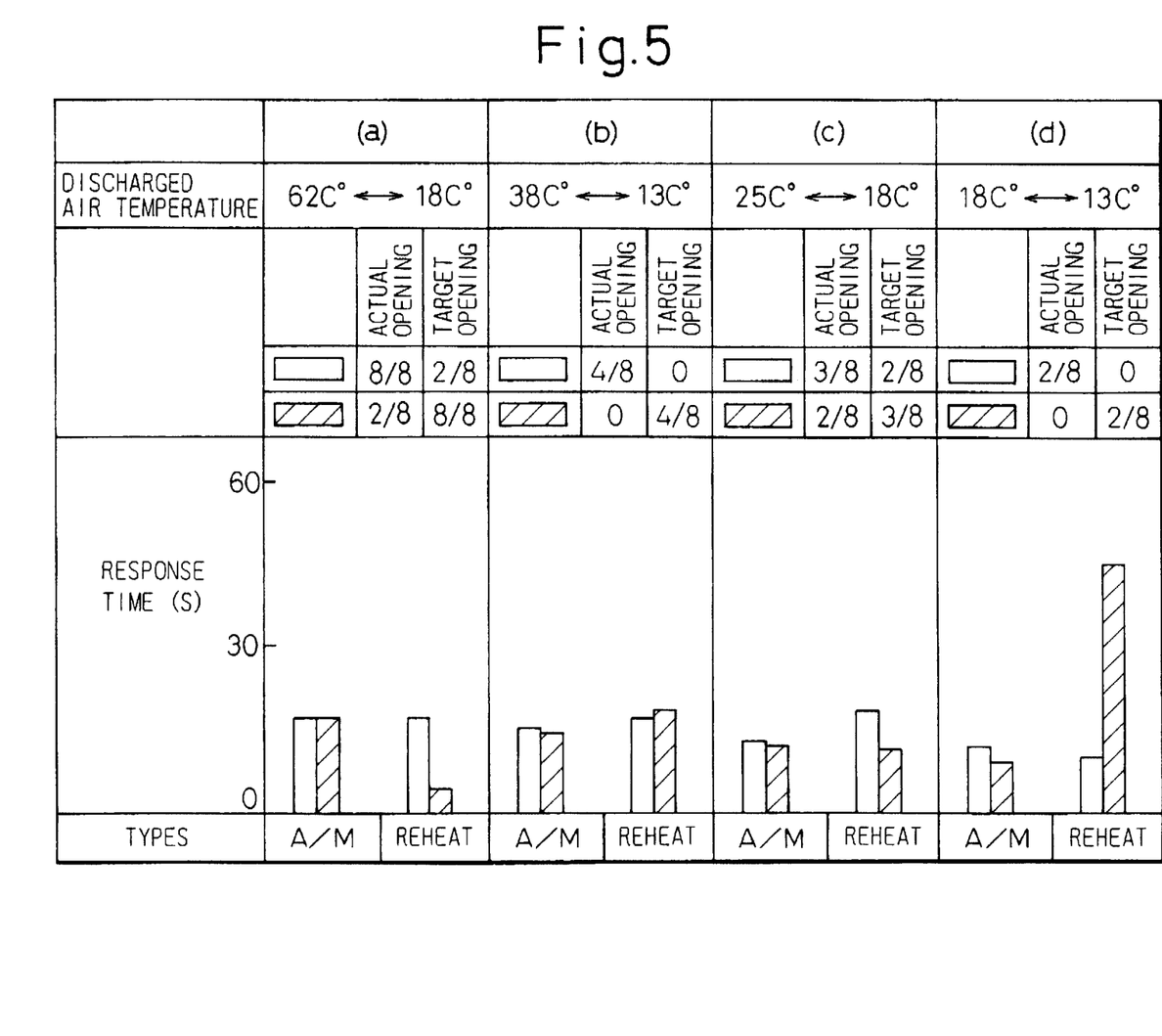
FIG. 5 illustrate graphs showing response time at various changes of the air conditioning conditions.
Figure 6A:
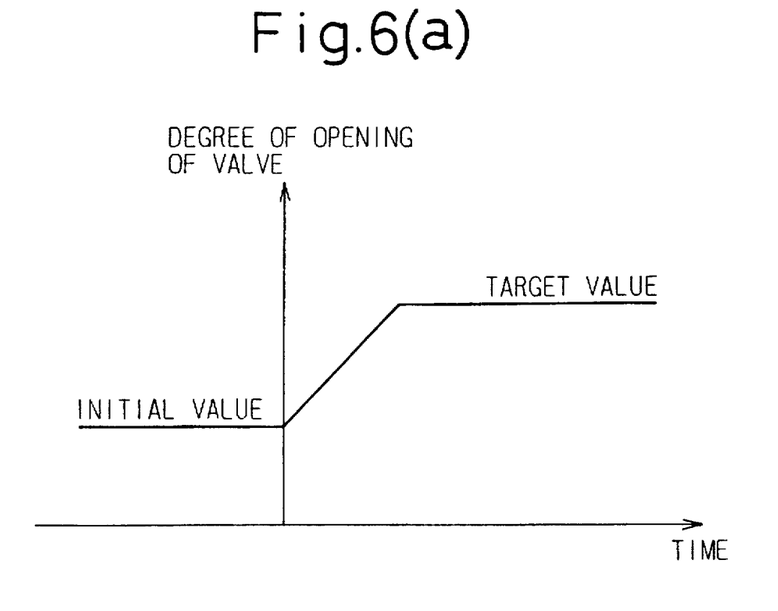
FIG. 6(a) illustrates a change in the degree of the opening from a actual value to a target value which larger than the actual value.
Figure 6B:
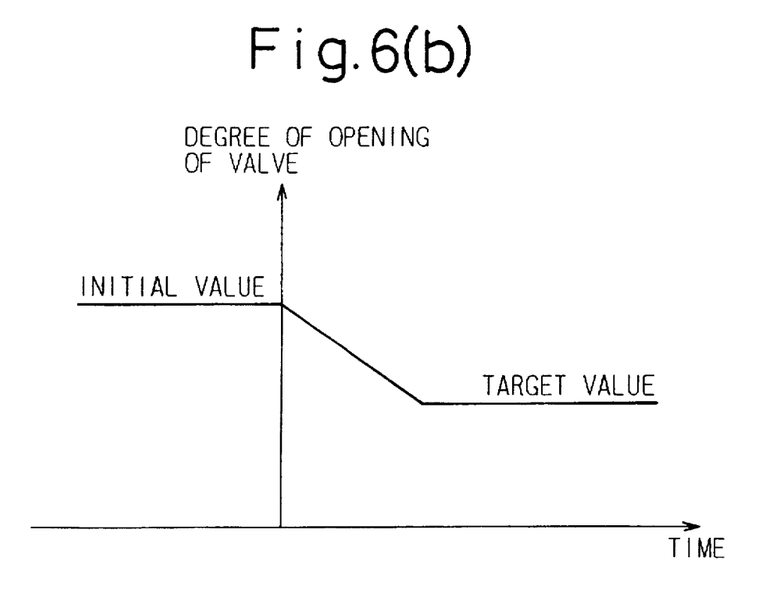
FIG. 6(b) illustrates a change in the degree of the opening from a actual value to a target value which smaller than the actual value.

Now, a result of tests as to a temperature response speed for the reheat type air conditioning system in comparison with that for an air-mix type air conditioning system will now explained. In the air-mix type air conditioning system, unlike the reheat type, where the cooled air flow is heated to a desired temperature, hot air after passing the heater core is mixed with cooled air which has by-passed the heater core to obtained an air mixture of a desired temperature. Each test was done by changing a degree of the opening of flow control valve (reheat type) or air mix damper (air mix type) to a target opening and by measuring a response time for making a temperature of the air discharged into the cabin to a target temperature corresponding to the target opening, in a similar way as explained in Japanese Unexamined Patent Publication No. 5-68704. FIG. 5 shows a result of the tests. It should, however, noted that, unlike this patent, the control of the degree of the opening of the valve is done such that the target temperature is obtained without any accompanying overshoot as shown in FIGS. 6(a) and 6(b).

In FIG. 5, the degree of the opening of the control valve 5 (FIG. 4) in a reheat type system according to the present invention is expressed by a rotating angle of the valve member 5b, which is indicated by a digit 1 to 8 divided by a full opening indicated by a digit 8. Namely, the fully opened condition of the valve 5 to obtain the maximum heating effect is expressed by "8/8", while fully closed condition of the valve 5 to obtain the maximum cooling effect is expressed by "0". Contrary to this, for the air-mix (A/M) type, as a comparative example, a degree of the opening of the air mix damper is expressed by a rotating angle of the damper, which is also indicated by a digit 1 to 8 divided by a full opening indicated by a digit 8. Thus, the fully opened condition of the air mix damper to obtain the maximum heating effect is expressed by "8/8", while fully closed condition of the air mix camper to obtain the maximum cooling effect is expressed by "0".

Furthermore, in the above tests, a degree of the opening of the control valve 5 of "8/8" allows the flow speed of the hot water to the heater core 4 of 6 liters per minute to be obtained. Furthermore, degrees of the opening of the control valve 5 of "4/8", "3/8", "2/8" and "0" allow the flow speed of the hot water to the heater core 4 of 0.6, 0.4, 0.3 and 0 l/min, respectively, to be obtained.

Figure 7:
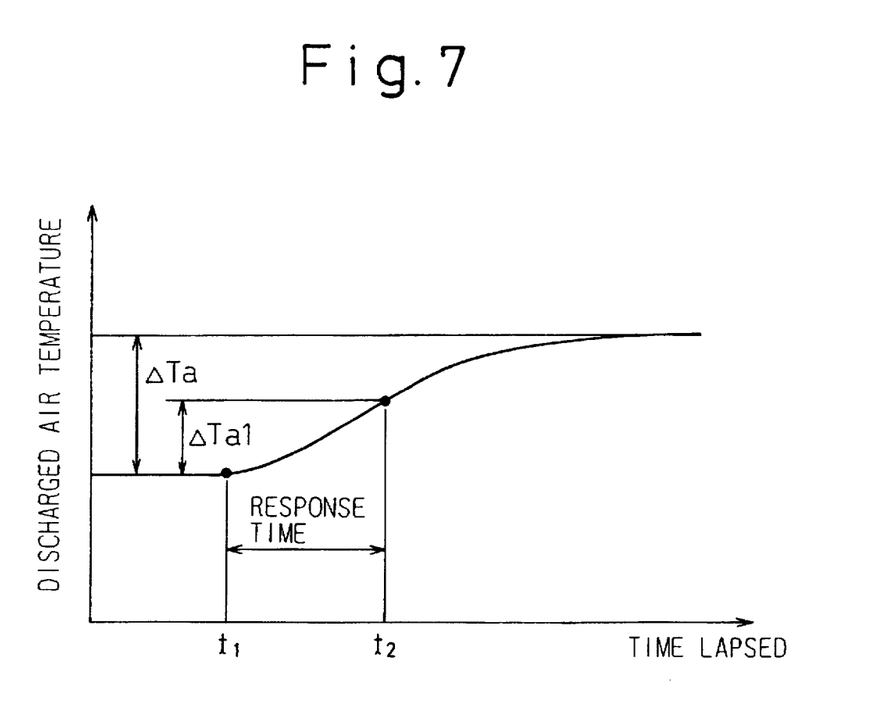
FIG. 7 shows typically a relationship between a time after the commencement of the setting of a target temperature and a discharged air temperature.

As shown in FIG. 7, the response time is a duration from a time $t_1$ whereat the movement of the flow control valve 5 is commenced to a time $t_2$ whereat a change of the temperature of $\Delta T_{a1}$ is obtained which is equal to $0.632 \times \Delta T_a$. The temperature difference $\Delta T_a$ is a difference, from the temperature of the air as discharged to the cabin prior to the commencement of the control of the valve 5, of a saturated temperature when the target degree of the opening of the flow control valve 5 is obtained.

In the tests in a column (a), non-shaded bars in the bar chart illustrate response times in seconds when the discharged air temperature is reduced, from 62° C. to 18° C. by reducing the degree of the valve or damper from "8/8" to "3/8", while shaded bars illustrate response times when the discharged air temperature is increased, from 18° C., to 62° C. by increasing the degree of the opening of the valve or damper from "3/8" to "8/8". In the tests in column (b), the discharged air temperature is changed in the similar way between 38° C. and 13° C. by changing the degree of the opening of the valve 5 or the damper between "4/8" and "0" and the measured response times are shown by non-shaded and shaded sections in bar charts. In the tests in column (c), the discharged air temperature is changed in the similar way between 25° C. and 18° C. by changing the degree of the opening of the valve 5 or the damper is changed between "3/8" and "2/8" and the measured response times are shown by non-shaded and shaded sections in bar charts. In column (d), the discharged air temperature is in the similar way changed between 18° C. and 13° C. by changing the degree of the opening of the valve 5 or the damper is changed between "2/8" and "0" and the measured response times are shown by non-shaded and shaded sections in bar charts.

As will be understood from the result of the tests in FIG. 5, a response time is substantially unchanged under changes of the air conditioning conditions (target air temperatures) as long as the columns (a) to (c) are concerned regardless the types of the air conditioning system between the reheat type and the air-mix type. However, in the column (d), a substantial increase in the response time is obtained when the existing temperature of 13° C. is increased to 18° C. as shown by the shaded section of the bar chart for the reheat type. In other words, from the tests in FIG. 5, a conclusion is obtained that an increased value of an overshoot in the value of the degree of the opening is necessary only in the case illustrated by the shaded chart in the column (d) for the re-heat type, while, for the remaining cases, any overshoot is not necessary.

Figure 8:
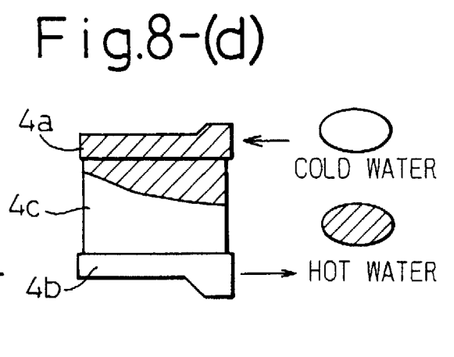
Figure 9:
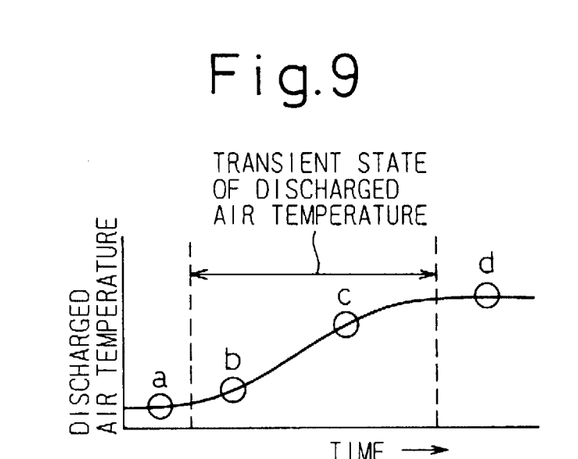
FIG. 9 shows a discharged air temperature at the respective stages in FIGS. 8-(a) to 8-(d).

Now, a test conducted by the inventors in order to discover the reason of the above mentioned result will now be explained. First, a heater core 4 made of a semi-transparent acrylic resin was prepared. Furthermore, the engine cooling water of a high temperature located between the flow control valve 5 and the engine 1 was dyed to a desired color. An observation was done to know how the dyed water flows or is distributed in the heater core 4. The result of this test will be described with reference to FIGS. 8-(a) to 8-(d) and 9. First, the flow control valve 5 was maintained under a fully closed condition, i.e., a degree of the opening of "0" for a duration of a certain time, which causes the heater core to be filled by the cold water as shown by FIG. 8-(a). In this case, between the heater core 4 and the flow control valve 5, the engine water is, although not shown in FIG. 8-(a), also under a cold state. A temperature of the air discharged to the cabin in this state is shown by a point a in FIG. 9.

Then, from the condition shown in FIG. 8-(a), the degree of the opening of the flow control valve 5 is increased to "3/8", which causes the dyed cooling water under a hot sate to be gradually introduced into the heater core 4 as shown by FIGS. 8-(b) and 8-(c). As will be clear form the initial flow pattern in FIGS. 8-(b) and 8-(c) the hot, dyed water flows, at the initial state, not only into the heater core section 4c but also into the upper tank 4. In other words, at the initial state of the flow, an amount of the hot water introduced into the heater core section 4c, which is directly related to the heating of the cabin, is only a part of the total flow of the hot water introduced into the heater core. The temperatures of the discharged air at this states are on the points b and c in the curve in FIG. 9.

After the upper tank 4a is filled by the hot or dyed water as shown in FIG. 8-(d), an amount of the flow of the hot water in the heater core section 4c is obtained, which is equal to the amount of the hot water introduced into the heater core 4. The temperature of the discharge air is at the point d in the curve in FIG. 9.

The above phenomenon as explained with reference to FIGS. 8-(a) to 8-(d) suggest that a response time in the case of the shaded bar section in the bar chart in FIG. 5-(d) is increased due to the following two reasons (1) and (2). First, (1) when the degree of the opening of the flow control valve 5 is "0", i.e. the valve is fully closed, the water in the inlet tank 4a as well as the water in the water conduit 3 between the flow control valve 5 and the inlet tank 4a are in a cold condition, so that an opening of the flow control valve 5 to the target opening "⅜" can only slowly increase the temperature of the water at the heater core section 4c. Second, (2) the target degree of the opening "⅜" is only slightly larger than the existing degree of the opening "0", i.e., a change of the degree of the opening is small, which causes an absolute amount of the water introduced into the heater core 4 to be small, which assists in the slowness in the increase in the temperature caused by the reason (1).

In view of the result of the above tests, it is concluded that it is necessary to incorporate an overshoot control of the degree of the opening of the flow control valve when the above mentioned requirements (1) and (2) are satisfied. Otherwise, any overshoot control is unnecessary.

It should be noted that a determination of the overshoot opening in the Japanese Unexamined Utility Model Publication No. 5-68704, the overshoot opening is essentially determined in accordance with a difference between the target opening and the existing degree of the opening in the control valve. Thus, in case of a small difference between the target opening and the existing opening as shown by the column (d) in FIG. 5, a small overshoot opening is determined. Contrary to this, in case of a large difference between the target opening and the existing opening as shown by the column (a) in FIG. 5, a large overshoot opening is determined. As a result, the prior art suffers from a difficulty that a desired overshoot can not be obtained when a overshoot is necessary for the flow control valve, which makes a response speed, in the temperature of the discharged air, to be worse. Furthermore, a large overshoot is obtained, when an overshot control of the flow control valve is unnecessary, which causes a number of unnecessary operations to be highly increased in the drive means of the flow control valve.

It should be noted that the result in FIG. 5 is obtained under particular conditions as explained with reference to FIGS. 1 to 4. In other words, changes of a shape and a volume of the inlet tank 4a as well as a construction of the flow control valve would cause the result to be changed. Thus, depending of the conditions of the tests, values of the existing and the target degree of the opening of the flow control valve, whereat the above requirements are met, can be changed.

In view of the above, in the prior art, a degree of the overshoot is determined in accordance with the deviation of the opening of the flow control valve between the target degree and the existing degree. Thus, a difficulty arises in that a large overshoot is not obtained, which is necessary even when the value of the deviation is small, and an overshoot which is unnecessary when the value of the deviation is large is generated.

Figure 10:
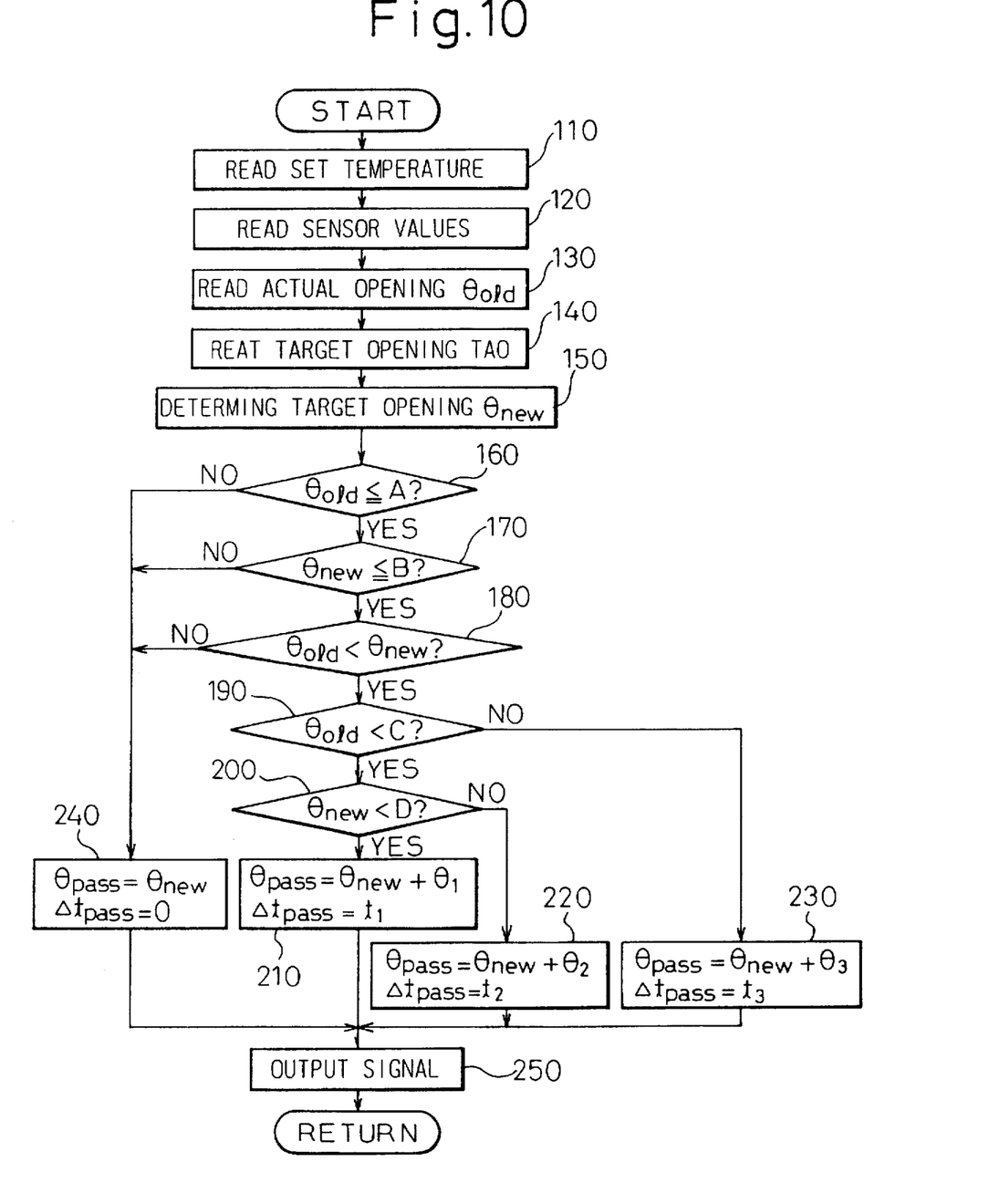
FIG. 10 is a flow chart illustrating an operation of the flow control valve.

Now, an operation of the control circuit 10 for overcoming the above mentioned difficulty will be explained with respect to a flow chart shown in FIG. 10. Namely, when an ignition switch (not shown) of the vehicle causes the control circuit 10 to be electrically powered, the routine in FIG. 10 commences. At step 110, a set temperature by the temperature setter 12 is read out. At step 120, various sensor values, that are a room temperature Tr detected by the room air temperature sensor 11a, an atmospheric air temperature Tam detected by the outer temperature sensor 11b, and a sun radiation amount Ts detected by the sun radiation amount Ts are read out. At step 130, a degree of the opening $\theta_{old}$ detected by the potentiometer 9 is read out. Thus potentionmeter 9 acts as a flow amount detecting means.

Next, at step 140, by using the various value read out at steps 110 to 130, a target temperature TAO of the air discharged to the cabin is calculated by using the following equation, $$TAO = K_{set} \times T_{set} - K_r \times T_r - K_{am} \times T_{am} - K_s \times T_s + C,$$

where $K_{set}$, $K_r$, $K_{am}$ and $K_s$ are gains related to the set temperature $T_{set}$, the room temperature $T_r$, the atmospheric air temperature $T_{am}$ and the sun radiation amount $T_r$, respectively, while C is constant.

At the following step 150, based on the value of the target discharged air temperature TAO by the above equation, a value of the target opening $\theta_{new}$ of the flow control valve 5 is calculated. Thus step 150 is a target flow amount calculating means for calculating a target flow amount of the hot water from the hot water source to the heat exchanger. Namely, a look up table of the target opening $\theta_{new}$ with respect to the value of the target temperature TAO is provided, such that higher the value of the target discharged air temperature TAO, larger is the degree of the target opening $\theta_{new}$ of the flow control valve 5. A well known interpolation is done to obtain a value of the target opening $\theta_{new}$ of the flow control valve 5, which corresponds to the target discharged air temperature TAO.

At the following step 160, which is a first determining means, a determination is done if the existing value of the degree of the opening $\theta_{old}$ of the flow control valve 5 read out at the step 130 is equal to or less than a predetermined value A. At step 170, a determination is done if the target degree of the opening $\theta_{new}$ determined at the step 150 is equal to or less than a predetermined value B. Furthermore, at step 180, it is determined if the existing value $\theta_{old}$ of the opening of the flow control valve 5 is smaller than the target value $\theta_{new}$ of the degree of the opening of the flow control valve 5. Thus steps 170 and 180 act as a second determining means for determining if the target hot water amount calculated is different from the detected actual hot water amount and is in a second range. A yes determinations at all of the steps 160 to 180 mean that a change of the setting of an air conditioning system requires a temporally overshoot control of the degree of the opening of the flow control valve 5 as shown by the shaded bar in column (d) in FIG. 5. In this case, the routine goes to steps 190 to 230 and 250 in order to execute the temporal overshoot control of the degree of the opening of the flow control valve 5. A no determination obtained at steps 160, 170 or 180 means that the overshoot control is not needed, so that the routine goes to steps 240 and then to 250, so that the degree of the opening of the flow control valve 5 is directly controlled to the target degree of the opening $\theta_{new}$ determined at the step 150.

Now, a detail of the steps 190 to 230 and 250, which act as a first control means for controlling the flow control valve, will now be explained. At step 190, a determination is done if the existing degree $\theta_{old}$ of the opening of the flow control valve 5 is smaller than a predetermined value C, and, at step 200, a determination is done if the target degree of the opening $\theta_{new}$ is smaller than a predetermined value D. In this embodiment of the present invention, the predetermined values C and D are set to "⅛", which corresponds to a flow rate of 0.2 liters per minute.

When yes determinations are obtained at both of the steps 190 and 200, the routine goes to step 210, where $\theta_{pass}$ is calculated as $\theta_{new}+\theta_1$, and $\Delta t_{pass}$ is calculated as $t_1$. When a yes result is obtained at step 190 and no result is obtained at step 200, the routine to go to step 220, where $\theta_{pass}$ is calculated as $\theta_{new}+\theta_2$, and $\Delta t_{pass}$ is calculated as $t_2$. When no determinations is obtained at step 190, the routine goes to step 230, where $\theta_{pass}$ is calculated as $\theta_{new}+\theta_3$, and $\Delta t_{pass}$ is calculated as $t_2$. It should be noted that the relationship between values of $t_1$, $t_2$, and $t_3$ is such that $t_1 > t_2 > t_3$.

After the execution of the step 210, 220 or 230, the routing goes to step 250, where a control of the servo motor 8 is done, so that the degree of the opening of the control valve 5 is temporally controlled to $\theta_{pass}$ until the calculated time $\Delta t_{pass}$ is elapsed, and, after the elapse of this time $\Delta t_{pass}$, the degree of the opening of the control valve 5 is controlled to $\theta_{new}$. See a diagram in FIG. 11.

At the step 240, defining a second control means, which is executed when no determination is obtained at the step 160, 170 or 180, i.e., the state of a change of a setting of the air conditioning does not require an overshoot control, $\theta_{pass}$ is directly controlled to $\theta_{new}$ and $\Delta t_{pass}$ is cleared, i.e., an overshoot control of the degree of the opening of the flow control valve 5 is canceled.

Figure 12:
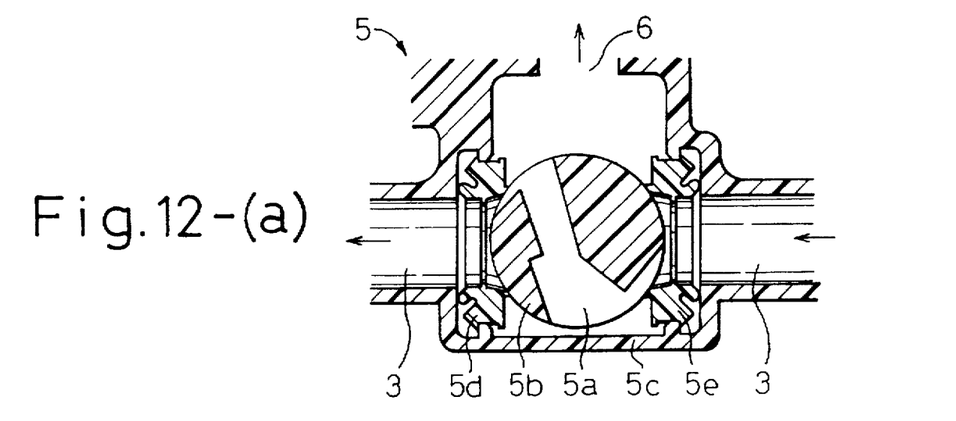

Now, an example of an operation of the flow control valve 5 will be explained when the degree of the opening $\theta_{old}$ when the control is commenced is $^{0.5}/_8$ and the target degree of the opening $\theta_{new}$ is $^{1.5}/_8$. In this case, a yes determination is obtained at the step 190 and a no determination is obtained at the step 200, so that the routine flows into the step 220, where the degree of the opening of the flow control valve 5 is set to $\theta_{pass}=\theta_{new}+\theta_2$, while the overshoot time is set to $\Delta t_{pass}=t_2$. Namely, an initial state of the valve member 5b of the flow control valve 5 of an initial degree of opening of $\theta_{old}$ (=$^{0.5}/_8$) is shown in FIG. 12-(a). Then, the valve member 5b is rotated in a counter clockwise direction to a degree of opening of $\theta_{pass}$ (=⅘) as shown in FIG. 12-(b), thereby executing an overshoot control for a period of time of $\Delta t_{pass}$ (=$t_2$). Finally, the valve member 5b is rotated in a clockwise direction, so that the degree of the opening of the flow control valve is reduced to the target degree of the opening of $\theta_{new}$ (=$^{1.5}/_8$) as shown in FIG. 12-(c).

Figure 11:
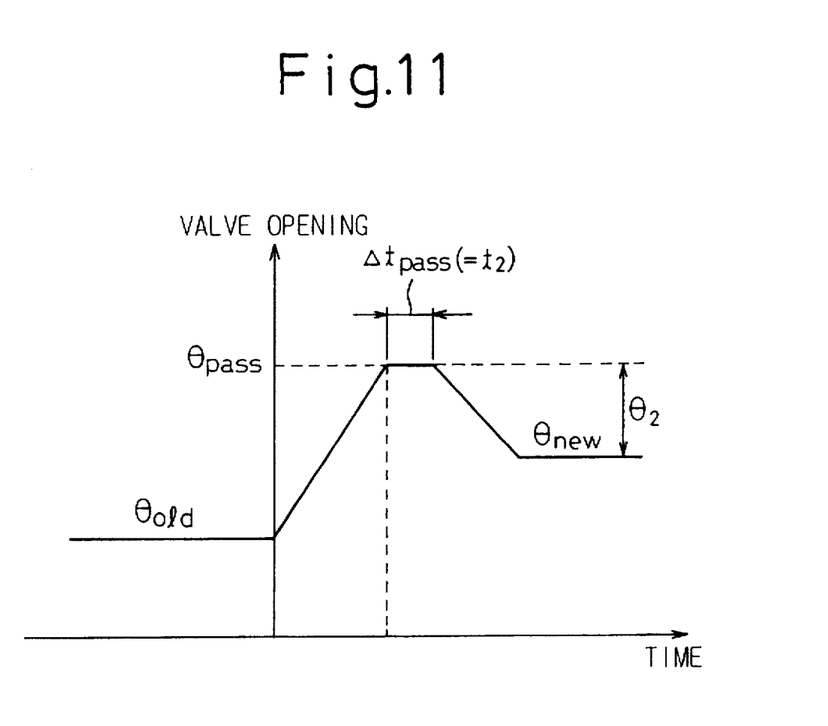
FIG. 11 illustrates a manner of a change of the degree of the opening of the flow control valve from an initial value to a target value.
Figure 13:
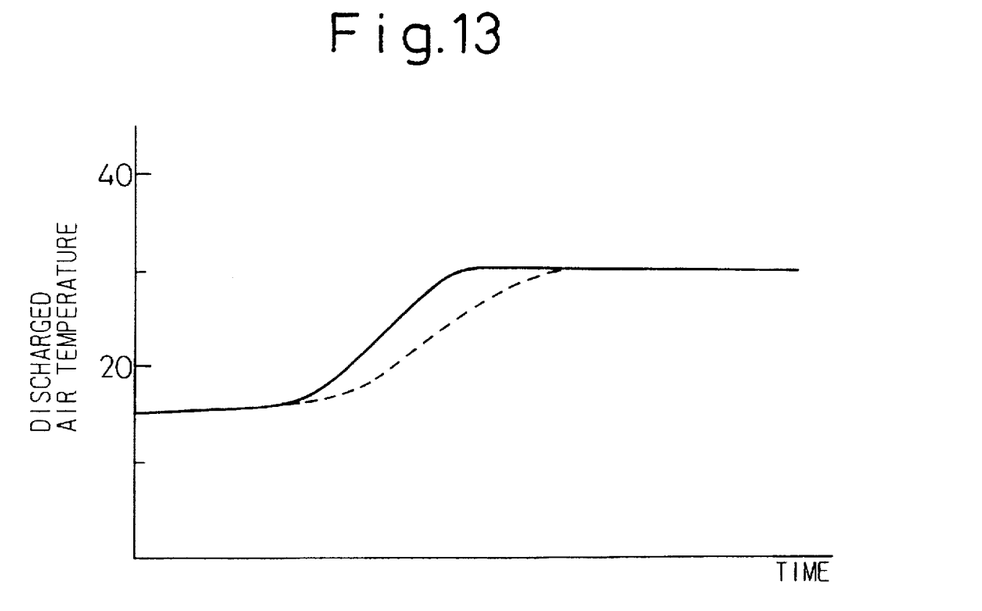
FIG. 13 illustrates a response characteristic (solid line) of the discharged air temperature to target air temperature is set in comparison with that of the prior art (dotted line).

In FIG. 13, the solid line shows an actual change of the discharged air temperature when an overshoot control as shown in FIG. 11 is practiced. In FIG. 13, a dotted line illustrates a change in the temperature when anovershoot control is not practiced, i.e., the existing temperature $\theta_{old}$ (=$^{0.5}/_8$) is "directly" controlled to the target temperate $\theta_{new}$ (=$^{1.5}/_8$).

In short, in the above embodiment, affirmative determinations at all of steps 160 to 180, i.e., conditions, which necessitate an overshoot control, are obtained, the degree of the opening of the flow control valve is initially controlled to a target opening $\theta_{new}$ plus a predetermined value $\theta_1$, $\theta_2$ or $\theta_3$, and then returned to the target opening $\theta_{new}$, which allows the response time to be reduced over the case when no overshoot control practiced as illustrated in FIG. 12.

Furthermore, in the above embodiment if a negative determination at any one of steps 160 to 180, i.e., a condition, which does not necessitate an overshoot control, is obtained, the degree of the opening of the flow control valve is directly controlled to a target opening $\theta_{new}$ without practicing overshoot control. Thus, unnecessary overshoot control is eliminated, thereby reducing a number of the operation of the servo motor.

In the above embodiment, the predetermined value A at the step 160 and the predetermined value B at the step 170 are determined to A=⅔ and B=⅔, respectively based on a result of the test. However, a change in the various factors, such as a shape or volume of the inlet tank 4a of the heater core, as well as a construction of the flow control valve may necessitate the valve of A and B to be varied.

Figure 14:
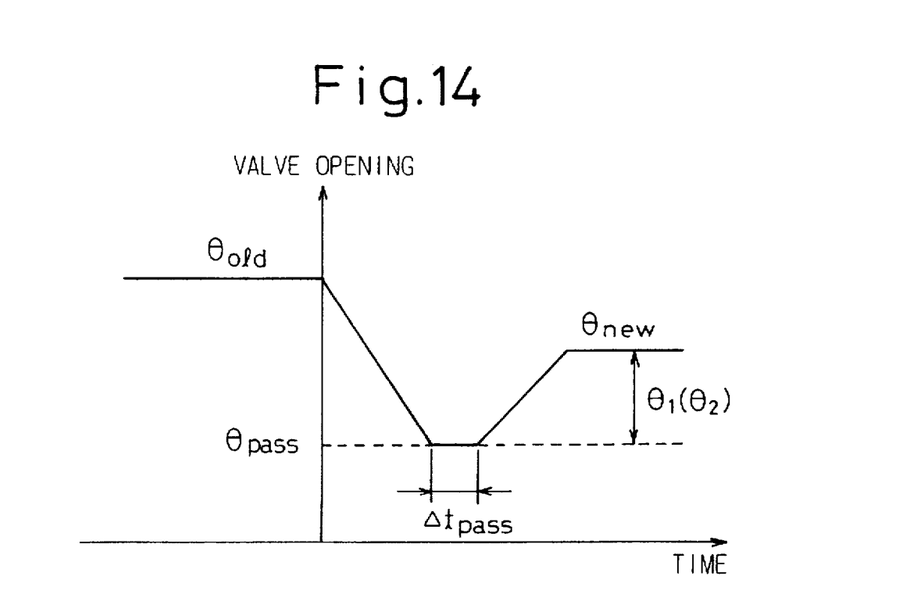
FIG. 14 is similar to FIG. 11 but illustrates a case when a target temperature is reduced.

In the above embodiment, one of the steps 210 to 230 is practiced when the target opening $\theta_{new}$ is larger than the existing opening $\theta_{old}$, i.e., the target amount is larger than the existing amount of the flow from the engine to the heater core 4. However, one of the steps 210 to 230 is practiced when the target opening $\theta_{new}$ is smaller than the existing opening $\theta_{old}$. In this case, a setting of the change of the degree of the opening of the flow control valve 5 is as shown in FIG. 14.

The above embodiment is directed to so called "all flow type", where the construction of the heater core 4 is such that, from the inlet tank 4a to the outlet tank 4b, the water flows only in one direction in the core portion 4c. However, the present invention can be utilized for a U-turn type, where the a U-turn flow of the hot water is obtained in the heater core.

The above embodiment is directed to a so called flow control type where the flow control valve is provided for controlling the amount of the hot water from the engine 1 to the heater core. However, the present invention can also be applied to so called temperature control type where a valve is provided for controlling the temperature of the hot water flowing in the heater core.

In the above embodiment, a servo motor is provided for electrically controlling the valve member 5b of the flow control valve. However, the flow control valve 5 can be of a mechanically operated type.

Finally, the above embodiment is directed to an application to a heating device for an air conditioning system for a vehicle. However, the present invention is used for a hot water type heating device for an air conditioning of a building.

We claim:

1. A heating system for heating an air flow to a chamber, comprising:

a source of a hot water;

a passageway for a re-circulation of the hot water from the source;

a heat exchanger arranged on said passageway for obtaining a heat exchange between the hot water and an air flow for heating the air flow;

a flow control valve arranged on the passageway for controlling an amount of the of water directed to the heat exchanger;

a flow amount detecting means for detecting an actual amount of the hot water from the hot water source to the heat exchanger;

a target flow amount calculating means for calculating a target flow amount of the hot water from the hot water source to the heat exchanger;

first determining means for determining if the actual hot water amount detected by the detecting means is in a first range;

second determining means for determining if a value of the target hot water amount calculated by the calculating means is different from the detected actual hot water amount and is in a second range;

a first control means for controlling said flow control valve in such a manner that an amount of the hot water from the hot water source to the heat exchanger is, initially, controlled to the calculated target value plus a predetermined overshoot amount, and, then, controlled to the calculated target value, when it is determined by the first determining means that the actual hot water amount detected by the detecting means is in a first range and it is determined by the second determining means that a value of the target hot water amount calculated by the calculating means is different from the detected actual hot water amount and is in a second range;

a second control means for controlling said flow control valve in such a manner that an amount of the hot water from the hot water source to the heat exchanger is controlled to the calculated target value when it is determined by the first determining means that the actual hot water amount detected by the detecting means is out of the first range or it is determined by the second determining means that a value of the target hot water amount calculated by the calculating means is the same as the detected actual hot water amount or is out of the second range.

2. An apparatus according to claim 1, wherein said first control means includes means for calculating a desired degree of the overshoot when it is determined by the first determining means that the actual hot water amount detected by the detecting means is in a first range and it is determined by the second determining means that a value of the target hot water amount calculated by the calculating means is different from the detected actual hot water amount and is in a second range.

3. An apparatus according to claim 1, wherein said first range determined by said first determining means is a range of a hot water from a zero value to a predetermined small value.

4. An apparatus according to claim 1, wherein said predetermined small value is equal to 5% of the maximum flow amount of the hot water.

5. An apparatus according to claim 1, wherein said second range corresponds to a range of an amount of hot water from the hot water source to the heating apparatus from zero value to a value corresponding to 5% of the maximum hot water amount.

6. An apparatus according to claim 1, wherein said second determining means determines if the calculated target value of the flow amount is larger than the actually detected flow amount and is in said second range.

7. An apparatus according to claim 1, wherein said heat exchanger comprises an inlet tank for receiving hot water controlled by the flow control valve, an outlet tank for returning the hot water after the heat exchange to the hot water source, and a core arranged between the inlet tank and the outlet tank in such a manner that the hot water flows from the inlet tank to the outlet tank, so that a heat exchange occurs at the core between the hot water and the air flow contacted with the core.

8. An apparatus according to claim 1, wherein said flow amount detecting means detects an actual degree of the opening of the flow control valve, and said target opening calculating means calculates a target degree of the opening of the flow control valve.

* * * * *